United States Patent [19]
Keeley et al.

[11] Patent Number: 5,293,384
[45] Date of Patent: Mar. 8, 1994

[54] MICROPROCESSOR BUS INTERFACE PROTOCOL ANALYZER

[75] Inventors: James W. Keeley, Nashua, N.H.; Richard A. Lemay, Carlisle, Mass.

[73] Assignee: Bull HN Information Systems Inc., Billerica, Mass.

[21] Appl. No.: 771,581

[22] Filed: Oct. 4, 1991

[51] Int. Cl.⁵ .............................. G06F 11/00
[52] U.S. Cl. ............................. 371/16.3; 371/62; 395/275
[58] Field of Search ............. 371/16.3, 16.5, 29.5, 371/62; 395/550, 575, 275

[56] References Cited

U.S. PATENT DOCUMENTS

| | | | |
|---|---|---|---|
| 4,956,842 | 9/1990 | Said | 371/62 |
| 5,067,071 | 11/1991 | Schanin et al. | 395/275 |
| 5,193,181 | 3/1993 | Barlow et al. | 395/575 |

FOREIGN PATENT DOCUMENTS

| | | |
|---|---|---|
| 0157075 | 9/1985 | European Pat. Off. |
| 0301501 | 1/1989 | European Pat. Off. |
| 9110195 | 11/1991 | PCT Int'l Appl. |

OTHER PUBLICATIONS

European Search Report for corresponding EPO patent application 92 116896.9, transmitted in a communication dated Apr. 2, 1993.

*Primary Examiner*—Vincent P. Canney
*Attorney, Agent, or Firm*—Faith F. Driscoll; John S. Solakian

[57] ABSTRACT

A high performance microprocessor has associated therewith, protocol monitoring apparatus for monitoring all of the commands issued by the microprocessor and detecting when the protocol was not completed properly or completed within certain preestablished periods of time. When the monitor/timing circuits detect a protocol error, the monitoring apparatus operates to generate an output control signal which unwedges the microprocessor enabling it to continue further processing. Additionally, the monitoring apparatus includes a register for storing the address and command that the microprocessor was executing at the time of the protocol error. The same register is also used to capture address and command information for any other type of error.

12 Claims, 5 Drawing Sheets

MICROPROCESSOR BUS
STATE MACHINE OVERVIEW

MICROPROCESSOR BUS INTERFACE PROTOCOL ANALYZER

BACKGROUND OF THE INVENTION

1. Field of Use

The present invention relates to data processing systems and, more particularly, to fault tolerant processors.

2. Prior Art

As data processors become entrusted with performing increasingly more critical tasks requiring high dependability, this increases the need for such processors to be fault tolerant. The goal of a fault tolerant design has been stated as one to improve dependability by enabling a system to perform its intended function in the presence of a given number of faults.

Fault tolerance in data processing systems has been achieved through redundancies in hardware, software, information and/or computations. A fault tolerance strategy is considered to include one or more of the following elements. It includes masking (dynamic correction of generated errors); containment (prevention of error propagation across defined boundaries); detection of errors (symptoms of faults); diagnosis (identification of the faulty module responsible for a detected error); repair/reconfiguration (elimination or replacement of a faulty component or a mechanism for bypassing it); and system recovery (correction of the system to a state acceptable for continued operation.

One prior art pipelined central processing system includes in each circuit board of the system, one or more unusual event (UEV) detector circuits designed to detect when the pipeline stage associated therewith is exhibiting abnormal behavior. The phrase "abnormal behavior" refers to the performance of operations by a stage which do not make sense in terms of the functions normally performed by such stage. Such detector circuits are capable of detecting abnormal behavior conditions such as an assumption of an unusual machine state which does not make sense in terms of the input signals being applied, the sending or receiving of an improper sequence of commands in which there is an attempt to perform an operation which is inconsistent with a previously performed operation or an attempt to access a firmware control store location which is inconsistent with normal operation.

The interface board of the processor includes special register circuits for storing the system bus address information pertaining to the last physical address presented to the system bus as well as the address pertaining to a last lock memory operation. If a failure occurs in the pipeline stages for any reason, the address contents of the physical address register indicate to the software, the last physical address or I/O channel number that was being used by the processor in connection with accessing the system bus. For further information regarding the above, reference may be made to the copending patent application of George A. Barlow, et al. entitled, "Recovery Method and Apparatus for a Pipelined Processing Unit of a Multiprocessor System" issued as U.S. Pat. No. 5,193,181, on Mar. 9, 1993.

While the above processor provided for the detection of such unusual events, it provided it at the system bus interface level and as such did not permit immediate processor action. That is, normally, the UEV indications were stored in an area of memory for carrying out later diagnostic analysis to determine the faulty element. Also, at the system level, the detection apparatus was not required at high speed. More importantly, the apparatus only had the capability to detect incorrect sequences of commands being issued by the processor to the system bus.

Accordingly, it is a primary object of the present invention to provide apparatus for monitoring the protocol of a high performance microprocessor.

SUMMARY OF THE INVENTION

The above object and advantages of the present invention are achieved in a preferred embodiment of the monitoring apparatus of the present invention which is coupled to the bus interface of a high performance microprocessor. The monitoring apparatus includes a state machine which receive a plurality of bus protocol control signals and determines whether the microprocessor protocol sequences are completed properly. When the proper protocol sequence is not followed or it is not completed within the preestablished time period, the monitoring apparatus generates the proper ready response signal which prevents the microprocessor from being hung-up. This enables the microprocessor to continue further processing such as taking the necessary action to cause an unmasked interrupt for invoking error processing.

In greater detail, the monitoring apparatus includes types of timer circuits, one for monitoring commands issued by the microprocessor to an external system bus and another for monitoring commands issued by the microprocessor to perform internal operations on its local bus such as reading/writing internal register or for performing local memory operations.

In addition to the above, the monitoring apparatus of the present invention includes a output address register which couples to the microprocessor address and command lines and to the state machine. The state machine loads this register each microprocessor bus cycle of operation. Upon the detection of a protocol error or another type of error condition which produces an unmasked interrupt (NMI), the state machine inhibits further loading of the address register thereby capturing the exact address and command being issued by the microprocessor when the error occurred.

The above and other objects and advantages of the present invention will be better understood from the following detailed description taken in conjunction with the accompanying drawings.

DETAILED DESCRIPTION OF THE PREFERRED EMBODIMENT

Figure 1:
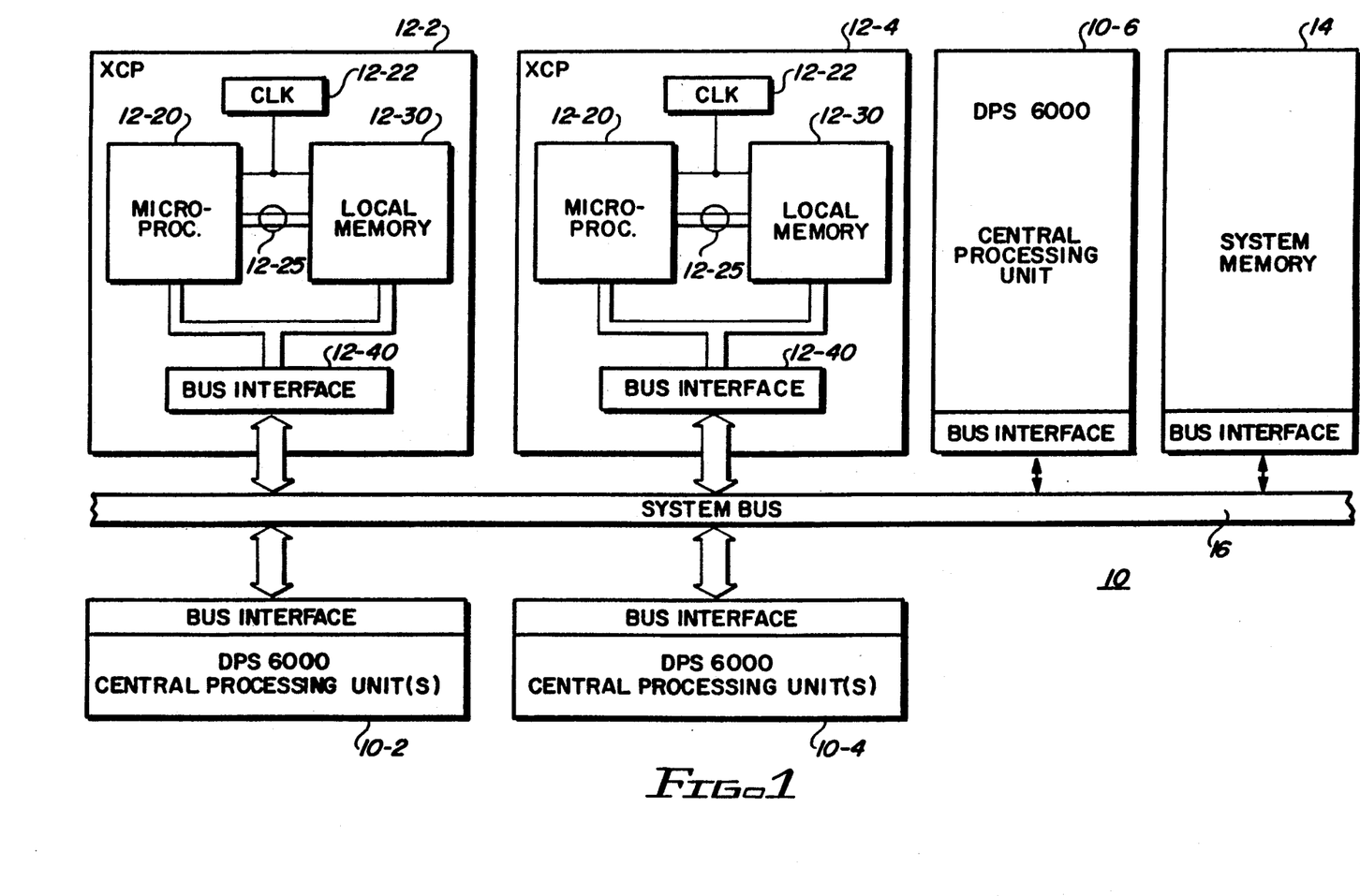
FIG. 1 is a block diagram of a multiprocessor system which incorporates the monitoring apparatus of the present invention.

Description of FIG. 1

FIG. 1 shows a multiprocessor system 10 which includes a plurality of central processing units 10-2 through 10-6 and peer processors 12-2 and 12-4 which tightly couple in common to a system bus 16 and to a main memory or system memory 14. Each processor, as shown, includes a bus interface area which enables the unit to transmit or receive requests in the form of commands, interrupts, data or responses/status to another unit on system bus 16. In the preferred embodiment, the system bus 16 operates asynchronously and uses a split bus cycle protocol which provides higher performance by granting other units bus cycles during the period of time a unit is waiting for main memory to furnish data in response to an earlier request made by that unit. For further information regarding this type of bus interface and operation, reference may be made to U.S. Pat. No. 3,997,896.

Referring to FIG. 1, it is seen that each peer processor 12-2 and 12-4 includes a microprocessor 12-20, a local memory 12-30 and interface buses which couple to the bus interface circuits of block 12-40 a shown. The microprocessor 12-20 and local memory 12-30 are tightly coupled through a local processor bus 12-25. The microprocessor 12-20 is a high performance 32-bit processor which operates at clock speeds of up to 33 MHz and in the preferred embodiment corresponds to an Intel 80486 chip. The Intel 80486 chip includes a microprocessor, a floating point math coprocessor, a memory cache controller and an 8K RAM cache unit. The principal processing function is performed by the microprocessor while complex processing functions, such as floating operations, are performed by the math coprocessor. The internal cache unit provides fast access to the data required for processing. In the preferred embodiment, peer processors 12-2 and 12-4 operate under the control of a UNIX* operating system.

*UNIX is a registered trademark of UNIX System Laboratories, Inc.

In FIG. 1 the processors 10-2 through 10-6 function as host processors. In the preferred embodiment, each processor takes the form of a Bull DPS6000 system which operates under the control of the Bull HVS proprietary operating system. In the system of FIG. 1, each of the processors are organized to operate in an independent manner and have access to the full complement of system resources, such as input/output units, main memory and the like.

Figure 2:
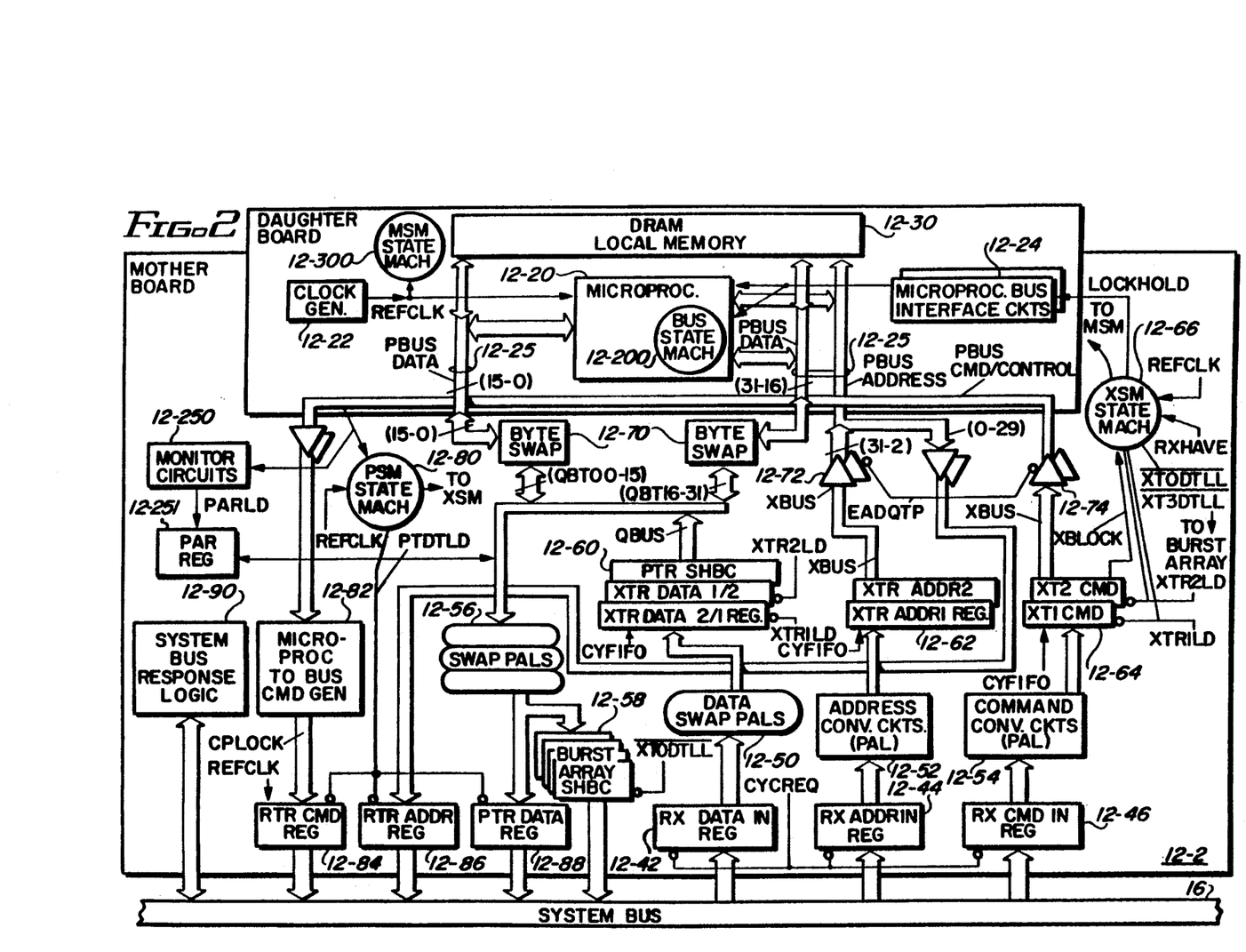
FIG. 2 shows in greater detail, a processing unit of FIG. 1 which incorporates the monitoring apparatus of the present invention.

Description of FIG. 2

FIG. 2 shows in greater detail, the processor 12-2 of FIG. 1. In the preferred embodiment, the microprocessor 12-20 and local memory 12-30, along with associated state machines 12-200 and 12-300, control circuits, in addition to clock generation circuits of block 12-22 are contained on a single daughter board, as shown. The clock generator circuits of block 12-22 generate a single frequency clock signal CLKREF of 33 MHz which provides the fundamental timing and internal operating frequency for microprocessor 12-20, in addition to all of the other circuits which make up processor 12-2. The system and bus interface circuits 12-24, input and output registers and state machines 12-80 and 12-66 are contained on the mother board. These two boards make up the entire processor.

In greater detail, the microprocessor 12-2 and local memory 12-30 are tightly coupled to the address, data and command/control processor bus lines of local bus 12-25, as shown. The circuits of block 12-24 serve as interface circuits which apply control signals to the microprocessor's bus interface which couples internally to the bus state machine 12-200. State machine 12-200 is used to control the microprocessor's access to local bus 12-25 by the generation of the proper bus protocol as a function of control signals generated by external state machine (XSM) 12-66. As explained herein, the XSM 12-66 controls the accessing of local memory 12-30, in response to external requests received from system bus 16.

As shown, the external requests received from system bus 16 are loaded into the receive data, address and command registers 12-42 through 12-46, in response to an enable signal CYCREQ generated by clock logic circuits, not shown. The address and command signals are converted into the appropriate form by address and command converter circuits of blocks 12-52 and 12-54 and stored in available registers of the two sets of queue registers of blocks 12-62 and 12-64. As shown, the registers of block 12-62 connect in common through tristate circuits to an output bus (X bus). Thereafter, the stored address and command signals are applied to the processor bus via the driver circuits of blocks 12-72 and 12-74, in response to an enabling signal EADQTP.

Any data associated with an external request loaded into register 12-42 is reordered as required by the programmable array logic (PALs) of block 12-50 and stored into the appropriate one of the registers of block 12-60 which connect in common to an output bus (Q bus) through tristate circuits. The different bytes of the data words are swapped from the so-called big endian format of the system bus to the little endian format utilized by microprocessor 12-20. This is accomplished by byte swap circuits of block 12-70 which is implemented by the proper reordering of connector pin connections.

The processor state machine (PSM) of block 12-80 controls the transfer and processing of transactions or requests initiated by microprocessor 12-20. As shown, commands generated by microprocessor 12-20 specifying an operation on system bus 16 are applied to a microprocessor to bus command generator of block 12-82 which, in turn, generates the appropriate system bus command. The bus command is loaded into a processor command register 12-84, along with the appropriate address and data. The address and data are loaded into registers 12-86 and 12-88, respectively, via an address bus and the Q data bus as shown in FIG. 2. This is all done in response to an enabling load signal PTDTLD generated by the PSM state machine 12-80 and control signals applied as an input to generator 12-82 and to the system bus response circuits of block 12-90. Additionally, the PSM 12-80 processes internal I/O requests initiated by microprocessor 12-20 for reading/writing different ones of a plurality of internal registers 12-68 connected to the Q bus. These registers include a channel address register (CAR) and a physical address register (PAR). The CAR register (not shown) is used to store channel number information transmitted to system bus 16 as part of an I/O command during normal I/O operations. The PAR register is used to store transaction address information. The Appendix contains further information about these registers.

Figure 3:
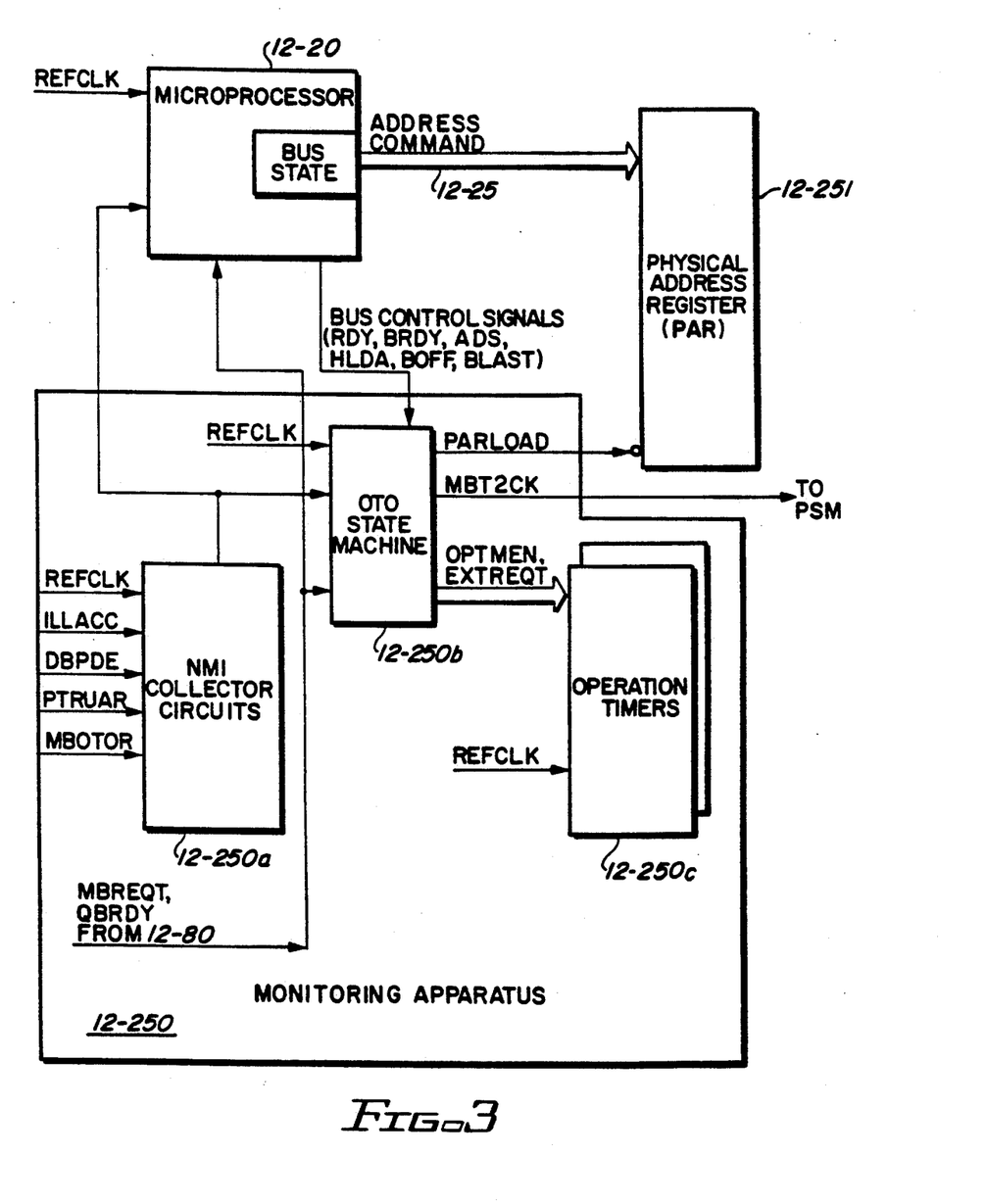
FIG. 3 shows in block diagram form, the monitoring apparatus of the present invention.

Description of FIG. 3

FIG. 3 shows in block form, the monitoring circuits 12-250 of the present invention. As shown, monitoring circuits 12-250 include the series connected non-maskable interrupt collector circuits (NMI) of block 12-250a, the state machine circuits of block 12-250b, and operations timer circuits of block 12-250c. The The NMI circuits 12-250a in response to detected error conditions corresponding to signals ILLACC−, DBPDE+, PRTUAR+ and MBOTOR+ generate non-maskable interrupt signal NMI. This signal is applied as an input to microprocessor 12-20 and to the state machine circuits of block 12-250b. These circuits monitor the bus protocol signals RDY through BLAST received from microprocessor 12-20 during its issuing commands. It sequences through a series of states and generates the required control signals for determining that the bus protocol proceeded properly and within the required time period.

As shown, state circuits 12-250b generate external request selection signal EXTREQT and operational time-out enable signal OPTMEN which are applied as inputs to the timer circuits of block 12-250c. These circuits provide two timing intervals, one interval for monitoring interval requests (i.e., an interval of 32 clocks) and another interval for monitoring external requests (i.e., 250 milliseconds).

Additionally, the state circuits of block 12-250b generate a physical address register load signal PARLD which enables the PAR register 12-251 to be loaded from the address and command lines of local bus 12-25 via the Q bus of FIG. 2.

Also, state machine circuits 12-250b generate delayed burst ready signal DHBRDY (i.e., signal BRDY delayed by one clock) which is applied as an internal input to state machine circuits 12-250b. The equations for generating the different signals of FIG. 3 are set forth in the Appendix.

Figure 4:
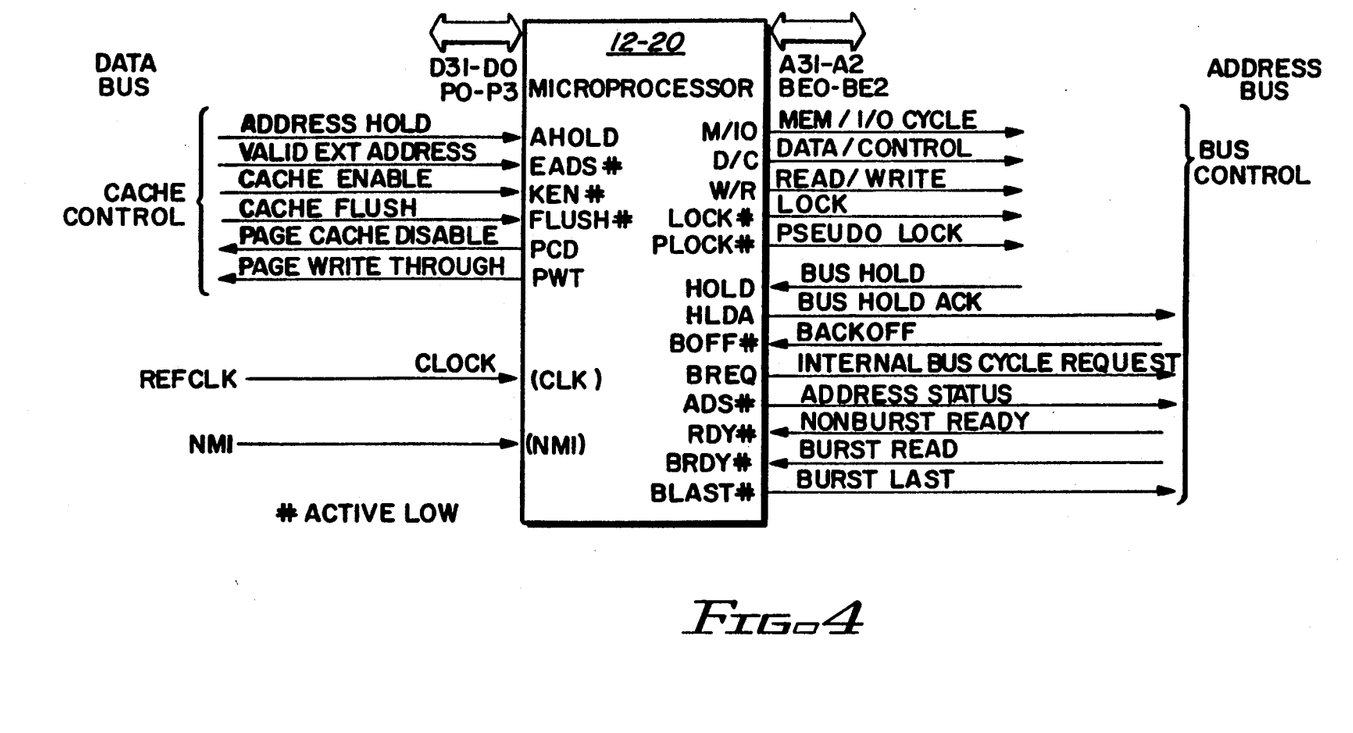
FIG. 4 is a block diagram of the microprocessor included in the processing unit of FIG. 2.

Description of FIG. 4

FIG. 4 shows in greater detail, the microprocessor 12-20 and the different interface signals. The interfaces are divided into sections which denote the different functions which do not necessarily correspond with the physical layout of the Intel 80486 chip. The address bus and bus control lines comprise the majority of the lines. The address lines are bidirectional for accommodating the cache bus snooping capability. The cache control section includes six pins for controlling the microprocessor's internal cache. The cache enable (KEN) input is most frequently used to disable areas of memory that cannot be cached.

The address hold (AHOLD) and external address strobe (EADS) inputs allow an external device to present the microprocessor 12-20 with an address. If the address matches an address in the microprocessor's internal cache, the associated data is flagged as invalid. The flush (FLUSH) cache input is used to inform the microprocessor that the entire contents of its cache are invalid. The page write-through (PWT) and page cache-disable (PCD) output pins reflect the states of the page attribute bit settings in internal page table entry or page directory entry registers. They indicate caching control that software has exerted over logical memory pages.

The bus control section includes thirteen pins for controlling the processor's bus under the microprocessor's bus control state machine. The bus request (BREQ) output signal indicates that the microprocessor needs the address/data bus. The back off input (BOFF) enables an external device to take control of the entire address/data bus even within an active, yet incomplete cycle. The pseudo lock output signal (PLOCK) is used by the microprocessor to indicate that the transaction it is performing requires more than one bus cycle to complete. By contrast, the bus lock signal (LOCK) is used to signal a critical read-modify-write operation in which no other system element can examine the item being modified until the current operation is complete. The microprocessor will not allow a bus hold request (HOLD) to take place wherein another bus master can complete control of the bus. That is, the microprocessor will not generate a hold acknowledge signal (HLDA), in response to a bus hold request.

The memory/input-output (M/IO), data/control (D/C), and write/read (W/R) signals are used to define the type of bus cycle being initiated. The address status output signal (ADS) indicates when these bus cycle definition signals and address signals are valid. The non-burst ready input signal (RDY) indicates that the current bus cycle is complete. The burst ready input signal (BRDY) and the burst last signal (BLAST) are used to carry out burst transfer operations.

The burst ready signal indicates that the current cycle is complete and the system will continue data transfer in the next clock cycle, unless the signal BLAST is presented. The BLAST signal signifies that the burst transfer is complete.

The non-maskable interrupt request signal indicates when an external non-maskable interrupt has been generated. The NMI signal must be held in a low state for at least four clock periods before rising in order to be properly detected during a particular clock cycle.

For further information regarding the use of these signals, reference may be made to the Intel publication entitled, "i486 MICROPROCESSOR," dated November, 1989, Order Number: 240440-002.

DESCRIPTION OF OPERATION

With reference to FIGS. 1 through 3, the operation of the monitoring apparatus of the present invention will now be described with reference to the diagrams of FIGS. 5 and 6.

Figure 5:
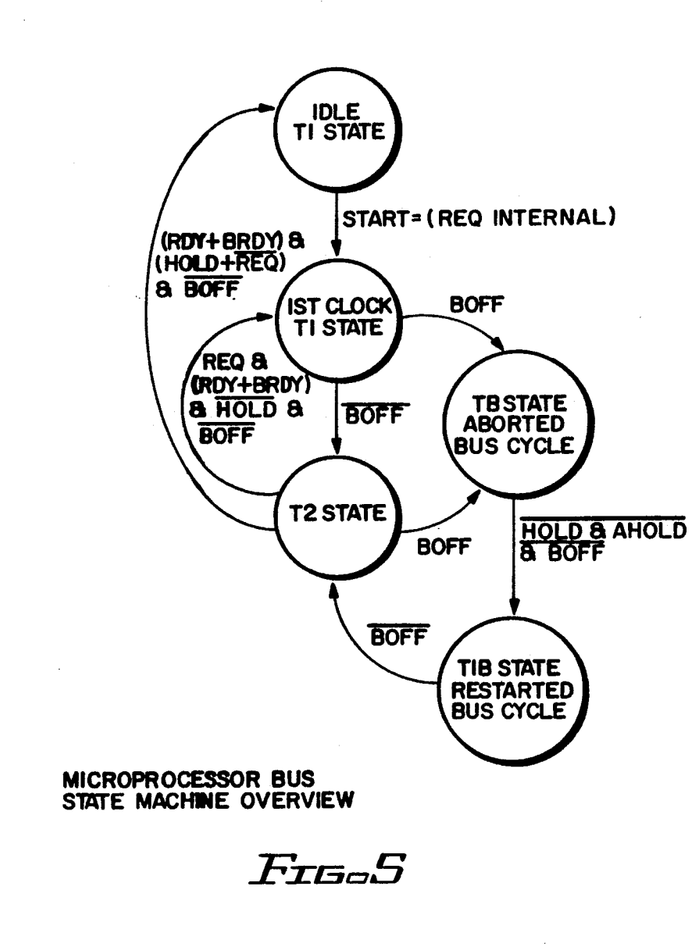
FIG. 5 is a state diagram illustrating the bus protocol used by the microprocessor of FIG. 4.

Description of FIG. 5

FIG. 5 illustrates the overall operation of the microprocessor's bus state machine 12-200 in accessing synchronous bus 12-25 for issuing commands to external and internal resources (i.e. local memory read/write operations and system bus memory and I/O operations).

In greater detail, FIG. 5 illustrates the overall operation of the microprocessor's bus state machine 12-200 in accessing synchronous bus 12-25 for executing memory read/write operations and I/O operations. As described, this state machine follows that of the microprocessor and in the preferred embodiment, follows the operation of the Intel 486 microprocessor. As seen from FIG. 5, the state machine 12-200 in an idle state (Ti) and remains in that state until it receives an internal request from the microprocessor in the absence of a hold (!HOLD) and a backoff (!BOFF). When that occurs, it sequences to state T1 which corresponds to the first clock cycle of a bus cycle. In this state, the valid address and status lines are driven and the address strobe ADS is generated.

In the absence of a backoff, state machine 12-200 sequences to state T2 as shown. When in this state, the second and subsequent bus cycles are performed. During each such cycle, the data lines are driven in the case of a write operation or in the case of a read, the states of the ready (RDY) and burst ready (BRDY) lines are sampled. When a backoff is issued (BOFF), the bus cycle is aborted and the state machine 12-200 sequences to state Tb. While in this state, machine 12-200 performs the second and subsequent clock cycles of an aborted bus cycle. As shown in FIG. 5, the state machine 12-200 remains in state Tb until there is no longer a hold (!HOLD) and backoff (!BOFF) present. At that time, state machine 12-200 restates the bus cycle by sequencing to state T1b. While in this state, machine 12-200 performs the first clock cycle of a restarted bus cycle. As in state T1, it drives the valid address and status lines in addition to generating an address strobe (ADS).

As seen from FIG. 5, state machine 12-200 sequences to state T2 to complete the operation. It is also seen that a backoff (BOFF) also affects sequencing from state T1 to state Tb in the same manner. The state machine 12-200 sequences from state T2 to state T1 in the case of another request or back to state Ti in the absence of a request under the conditions noted in FIG. 5.

Figure 6:
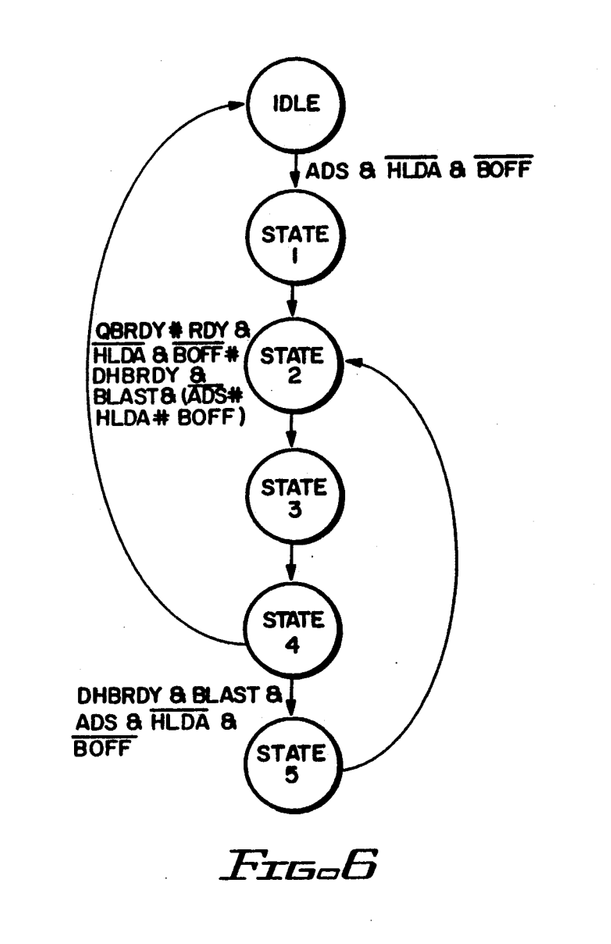
FIG. 6 is a diagram used to illustrate the operation of the monitoring apparatus of the present invention.

Description of FIG. 6

FIG. 6 is a state diagram illustrating the sequencing of state machine circuits 12-250 of FIG. 3. As shown, the state machine circuits 12-250b start in the idle state and remain in that state as long as the microprocessor 12-20 does not generate an address strobe signal !ADS. As soon as microprocessor generates address strobe signal ADS and there is no hold acknowledge, backoff or system bus clear signals present (i.e. !HOTHLDA, !QBBOFF, !MBMCLR), then state machine circuits 12-250b sequence to state 1. In the absence of system bus clear signal MBMCLR, state machine circuits sequence through states 2 through 4 in response to successive clock signals REFCLK. During state 3, the state machine circuits 12-250b generate PAR load signal PARLD which loads PAR register 12-251 with the address and command that the microprocessor 12-20 issued during the current bus cycle of operation.

When in state 4, the state machine circuits 12-250b generate operational timer signal OPTMEN+ which is applied to the timer circuits of block 12-250c. This enables the timer circuits which start either a 250 millisecond interval for external requests or a 32 clock interval for internal requests. The state of signal MBREQT from PSM state machine 12-80 defines which type of request. If signal MBREQT is a bianry ONE, the 250 millisecond interval is selected, and if a binary ZERO, the 32 clock interval is selected.

If the timer circuits exceed the selected interval, then it generates system bus operational time-out signal MBOTOR which is applied to NMI collector circuits 12-250a. This results in the generation of signal NMI which causes state machine circuits 12-250b to generate time-out signal MBT2CK which is forwarded to state machine 12-80. This results in the generation of ready signal QBRDY. Signal NMI also inhibits the generation of load signal PARLD+.

The signal QBRDY clears the microprocessor bus state machine in addition to resetting the state machine circuits 12-250b to the idle state. This path is followed when a blast signal was generated (i.e., BLAST), in the absence of another address strobe signal (!ADS), or hold acknowledge (!HLDA) or backoff (!BOFF).

The state circuits 12-250b also return to the idle state upon the occurrence of a ready (RDY) in the absence of a backoff or hold acknowledge (i.e., !HLDA or !BOFF) which indicates that the local memory 12-30 issued a ready to microprocessor 12-20 indicating that the bus protocol proceeded properly. When the state circuits 12-250b return to the idle state, this causes the resetting of the operational timer signal OPTMEN+ disabling timer circuits of block 12-250c.

As seen from FIG. 6, if internal signal DHBRDY is generated in the presence of a blast signal, and another address strobe in the absence of a hold acknowledge or backoff (i.e., !HLDA or !BOFF), state machine circuits 12-250b sequence to state 5 and then back to state 2. This sequence ensures that the PAR register 12-251 is loaded with valid information (provides three clock cycles from the time an address strobe is generated) in addition to causing the timer circuits to be disabled in the case of back to back bus cycles.

In addition to the above, the monitoring apparatus 12-250 also provides for the storage of addresses and commands that resulted in other types of non-maskable error conditions. This include the occurrence of an illegal memory access wherein the address was out of the range of local memory 12-30 (i.e., signal ILLACC), the detection of a data bus parity error (i.e., signal DBPDE) or the detection of a system bus unavailable resource (i.e., signal PTRUAR). The occurrence of any one of these signals also results in the generation of signal NMI which is forwarded to microprocessor 12-20.

The above has illustrated how the monitoring apparatus of the present invention is able to detect the improper completion of bus protocol sequence initiated by microprocessor 12-20 to local memory 12-30 or to system bus 16 with the addition of a small number of circuits.

It will be appreciated by those skilled in the art that many changes may be made without departing from the teachings of the present invention. For example, the invention may be used in conjunction with different types of protocols and commands. Also, while the preferred embodiment utilizes different PAL circuits to perform certain functions that such functions can be combined in certain instances and performed within a single circuit. Also, the invention is not limited to any specific type of circuit.

---

APPENDIX

Description of equation symbols:
(Where # = OR; ! = negation; and & = AND)
I. State Machine PAL Circuit 12-250b
MODULE XCM58
Pin Specifications:
   (Inputs)
REFCLK   PIN  1; "REFERENCE CLOCK
HOTRDY   PIN  2; "READY SIGNAL FROM DB

-continued
APPENDIX

| | | | |
|---|---|---|---|
| HOTBRDY | PIN | 3; | "BURST READY FROM DB |
| HOTADS | PIN | 4; | "ADDRESS STROBE FROM DB |
| MBMCLR | PIN | 5; | "MOTHER BOARD MASTER CLEAR |
| !HOTHLDA | PIN | 6; | "HOLD ACKNOWLEDGE FROM DB |
| !QBRDY | PIN | 7; | "READY FROM MOTHER BOARD |
| !QBBOFF | PIN | 8; | "BACKOFF FROM MOTHER BOARD |
| MBT2CK | PIN | 9; | "SYSTEM TIME 2 CLOCK |
| DBBLAST | PIN | 10; | "LAST BURST FROM DB |
| !MBREQT | PIN | 11; | "SYSTEM REQUEST |
| !OUTENA | PIN | 13; | "OUTPUT ENABLE (LOGIC 0) |
| MBNMI | PIN | 14; | "SYSTEM NON-MASKABLE INTERRUPT |
| (Outputs) | | | |
| !PARLOAD | PIN | 15; | |
| EXTREQT | PIN | 16; | "EXTERNAL REQUEST |
| Q0 | PIN | 19; | |
| Q1 | PIN | 20; | |
| Q2 | PIN | 17; | |
| OPTMEN | PIN | 21; | "OPERATIONAL TIMEOUT ENABLE |
| DHBRDY | PIN | 18; | "DELAYED BURST READY FROM DB |

EQUATES:
State Machine State Definitions
```
IDLE     = ^ B011;
STATE_1  = ^ B010;
STATE_2  = ^ B101;
STATE_3  = ^ B100;
STATE_4  = ^ B111;
STATE_5  = ^ B110;
STATE_6  = ^ B001;
STATE_7  = ^ B000;
OPTMOUT = [Q2,Q1,Q0];
```
End of State Machine State Definitions
EQUATIONS
```
PARLOAD  =  !MBNMI & (OPTMOUT == STATE_3);
DHBRDY   := "HOTBRDY & !HOTHLDA & !QBBOFF;
EXTREQT  := MBREQT;
OPTMEN   := (OPTMOUT == STATE_4);
```
State Machine Equations:
STATE_DIAGRAM OPTMOUT;
STATE IDLE:
  IF HOTADS & !HOTHLDA & !QBBOFF & !MBMCLR THEN STATE_1
  ELSE IDLE;
STATE STATE_1:
  IF !MBMCLR THEN STATE_2
  ELSE IDLE;
STATE STATE_2:
  IF !MBMCLR THEN STATE_3
  ELSE IDLE;
STATE STATE_3:
  IF !MBMCLR THEN STATE_4
  ELSE IDLE;
STATE STATE_4:
  IF QBRDY # MBMCLR # (HOTRDY & !HOTHLDA & !QBBOFF) #
    (DHBRDY & DBBLAST & !MBMCLR & (!HOTADS # HOTHLDA #
    QBBOFF))
  THEN IDLE
  ELSE
   IF DHBRDY & DBBLAST & HOTADS & !HOTHLDA & !QBBOFF &
    !MBMCLR
   THEN STATE_5
   ELSE STATE_4;
STATE STATE_5:
  IF MBMCLR THEN IDLE
  ELSE STATE_2;
STATE STATE_6:
  GOTO STATE_7;
STATE STATE_7:
  GOTO IDLE;

II. Registers
  a. Physical Address Register (PAR)
    The physical address register (PAR) captures
    the address of each transaction presented by
    microprocessor 12-20. The register stops
    capturing when an NMI is signalled and begins
    capturing again when the NMI is acknowledged
    by the reading of the contents of the syndrome
    register. The NMI handler software of the
    microprocessor 12-20 may determine the state
    of the control leads M/O, D/C, and W/R of the
    offending transaction by reading the channel
    address register. The data returned in
    response to a PAR read operation is

APPENDIX -continued byte-swapped and the two most significant bits are inverted. The PAR is read in response to a function code value of 60.

b. Channel Address Register (CAR)
The channel address register is preloaded by software prior to issuing a series of I/O commands. It is a 16-bit register used to store an I/O channel number in bit positions 9-0 to be transmitted to the system bus 16 to specify the I/O destination address of a microprocessor issured INw/OUTw command on I/O operations. Additionally, bit positions 12-10 store the states of the M/IO, D/C, and W/R leads of each transaction issued by microprocessor 12-20. The CAR register is read in response to a function code value of 40 and written in response to a function code value of 41.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. Monitoring apparatus for use with a microprocessor which couples to a synchronous bus in common with a memory for carrying out memory read and write operations according to a predetermined bus protocol, said microprocessor including an interrupt interface for processing non-masked interrupts (NMI), said monitoring apparatus comprising:

input circuits for receiving a number of signals indicative of error conditions and being coupled to said interrupt interface, said input circuits in response to any one of said number of signals generating an NMI signal;

a state machine coupled to said input circuits to receive said NMI signal and to said synchronous bus, said state machine being programmed to generate a predetermined sequence of state signals for monitoring sequences of bus protocol signals generated by said microprocessor in issuing commands on said bus; and, operational timer circuit means coupled to said state machine and to said input circuits, said timer circuit means being enabled by said state machine when in a first predetermined state to start a predetermined time interval corresponding to an interval normally required to complete execution of the type of command issued by said microprocessor, said timer circuit means generating a time-out signal at the end of said predetermined time interval prior to receiving a reset signal from said state machine indicating proper completion of said command according to said bus protocol signals and said input circuits in response to said time-out signal generating said NMI signal to said interrupt interface.

2. The monitoring apparatus of claim 1 wherein said monitoring apparatus further includes register circuit means coupled to said synchronous bus and to said state machine, said register circuit means being enabled by said state machine when in a second predetermined state to store address and command signals of each command applied to said bus during a current bus cycle of operation and said state machine in response to said NMI signal inhibiting further enabling of said register circuit means for facilitating interrupt processing by said microprocessor.

3. The monitoring apparatus of claim 1 wherein said operational timer circuit includes means for generating a number of predetermined time intervals, each associated with a different type of command.

4. The monitoring apparatus of claim 3 wherein said timer circuit means generates a first predetermined time interval of said number of predetermined time intervals which corresponds to an interval normally required for completing execution of an internal command by said microprocessor.

5. The monitoring apparatus of claim 4 wherein said microprocessor couples to a system bus for transmitting and receiving commands to units connected in common to said system bus and wherein said timer circuit means generates a second predetermined time interval of said number of predetermined time intervals which corresponds to an interval normally required for completing execution of an external command on said system bus by said microprocessor.

6. The monitoring apparatus of claim 1 wherein said state machine includes a synchronous programmable array logic (PAL) circuit programmed for generating said predetermined sequence of state signals, said PAL circuit being initially set to an idle state and in response to an address strobe signal sequencing to a first state and then through successive states in response to successive clock signals to said second predetermined state.

7. The monitoring apparatus of claim 6 wherein said PAL circuit in response to a next clock signal sequences from said second state to said first predetermined state for enabling said timer circuit, said PAL circuit remaining in said first state until an occurrence of one of a plurality of events as defined by the states of said bus protocol signals.

8. The monitoring apparatus of claim 7 wherein a first of said events includes the generation of a first protocol signal indicating completion of a multiple word transfer in the absence of signals indicating placement of another command on said synchronous bus, or that said microprocessor granted another unit control of said bus or was forced to give up control of said bus.

9. The monitoring apparatus of claim 8 wherein a second of said events includes receipt of a ready signal indicating that said command was proper, said ready signal disabling said operational timer circuit means and causing said PAL circuit to return to said idle state in the absence of signals indicating that said microprocessor granted said another unit control of said bus or was forced to give up control of said bus.

10. The monitoring apparatus of claim 9 wherein said PAL circuit sequences from said first state to a third state when said ready signal is received in the presence of said signal indicating completion of said multiple transfer and said signal indicating application of another command to said bus in the absence of said signals indicating that said microprocessor granted another unit control of said bus or was forced to give up control of said bus and said PAL circuit sequencing from said third state to an earlier state for ensuring that said register means is loaded with valid information pertaining to a next command applied to said bus by said microprocessor in the case of consecutive bus cycles.

11. The monitoring apparatus of claim 5 wherein said number of signals applied to said input circuits include signals indicating an occurrence of an illegal memory access, detection of a data bus parity error or detection of a system bus unavailable resource.

12. The monitoring apparatus of claim 1 wherein said NMI signal causes said microprocessor to reference a procedure for ascertaining the cause of said interrupt thereby preventing said microprocessor from assuming an unspecified state.

* * * * *